US012346708B1

(12) United States Patent
Agarwal et al.

(10) Patent No.: US 12,346,708 B1
(45) Date of Patent: Jul. 1, 2025

(54) CONCURRENT VISUALIZATION OF SESSION DATA AND SESSION PLAYBACK

(71) Applicant: Splunk LLC, San Jose, CA (US)

(72) Inventors: Umang Agarwal, Berkeley, CA (US); Akila Balasubramanian, Campbell, CA (US); Calvin Chan, Sunnyvale, CA (US); Khawar Deen, Sunnyvale, CA (US); Nikhil Kasthurirangan, Santa Clara, CA (US); Matthew William Pound, Seattle, CA (US); Justin Smith, San Francisco, CA (US); Taavo-Taur Tammur, Tartu (EE); Rashmi Kalyani Vasudevan, San Francisco, CA (US); Pragati Vyas, San Jose, CA (US); Sally Wahba, Apex, NC (US); John Bennett Wundes, Santa Rosa, CA (US)

(73) Assignee: Splunk LLC, San Jose, CA (US)

( * ) Notice: Subject to any disclaimer, the term of this patent is extended or adjusted under 35 U.S.C. 154(b) by 0 days.

(21) Appl. No.: 18/103,241

(22) Filed: Jan. 30, 2023

(51) Int. Cl.
G06F 9/451 (2018.01)
G06F 9/54 (2006.01)
G06F 11/34 (2006.01)

(52) U.S. Cl.
CPC .............. G06F 9/451 (2018.02); G06F 9/542 (2013.01); G06F 11/34 (2013.01); G06F 11/3414 (2013.01); G06F 11/3438 (2013.01)

(58) Field of Classification Search
CPC .......... G06F 9/451; G06F 9/542; G06F 11/34; G06F 11/3409; G06F 11/3414; G06F 11/3419; G06F 11/3423; G06F 11/3438
See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 10,430,212 | B1 * | 10/2019 | Bekmambetov ...... G06F 16/958 |
| 11,144,441 | B1 * | 10/2021 | Colwell .............. G06F 11/3692 |
| 2017/0090688 | A1 * | 3/2017 | Anderson ............. G06F 3/0482 |
| 2017/0286184 | A1 * | 10/2017 | Semenov ............ G06F 11/3447 |

(Continued)

OTHER PUBLICATIONS

Splunk Enterprise 8.0.0 Overview, available online, retrieved May 20, 2020 from docs.splunk.com.

(Continued)

Primary Examiner — Daniel Samwel
(74) Attorney, Agent, or Firm — Kilpatrick Townsend & Stockton LLP

(57) ABSTRACT

Described herein are techniques for concurrently visualizing real user's session data with a playback of a user's experience during a session. The disclosed techniques can correlate session data collected in response to interactions with an application during a user's session with session recreation data generated by the application and recorded during the user's session. The correlations between the session data and the recreation data can be used to render and control a recreation of the user's experience during the session concurrently with a visualization of the session data.

20 Claims, 10 Drawing Sheets

(56) References Cited

U.S. PATENT DOCUMENTS

| | | | | |
|---|---|---|---|---|
| 2018/0113577 A1* | 4/2018 | Burns | ................... | G06F 16/739 |
| 2018/0253373 A1* | 9/2018 | Mathur | ............... | G06F 11/3404 |
| 2019/0098106 A1 | 3/2019 | Mungel et al. | | |
| 2020/0396304 A1* | 12/2020 | Webber | ................ | G06F 11/302 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Sobolik, Thomas et al. "Use Datadog Session Replay to view real-time user journeys" pulled from the Internet on Jan. 30, 2023 "https://www.datadoghq.com/blog/session-replay-datadog/", Datadog, published Jul. 28, 2021.

"Session Replay" pulled from the Intrnet on Jan. 30, 2023 "https://www.dynatrace.com/platform/session-replay/" Dynatrace LLC.

"Session replay solutions for websites and web apps" pulled from the Intrnet on Jan. 30, 2023 "https://logrocket.com/for/session-replay/" LogRocket.

"Session Replay: Understand the user experience behind every data point" pulled from the Intrnet on Jan. 30, 2023 "https://www.fullstory.com/platform/session-replay/" fullstory.

"Record and replay the web" pulled from the Intrnet on Jan. 30, 2023 "https://www.rrweb.io/" rrweb.

* cited by examiner

CONCURRENT VISUALIZATION OF SESSION DATA AND SESSION PLAYBACK

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Computer systems may run applications or services that are provided via a server or a cloud-computing environment. The applications or services may be developed and deployed as a single unit or as multiple units, such as a collection of micro-services. With the rise of cloud native applications, e.g., Software as a Service (SaaS) applications, which include microservices, there has been a shift in the manner in which software is deployed, as well as in the manner in which the software is monitored and observed.

Real User Monitoring (RUM) (also referred to as real user measurement or end-user experiencing monitoring) is a type of passive performance monitoring that captures and analyzes each transaction by users of a website or an application (e.g., a cloud-based microservices-based application). Monitoring actual user interaction with a website or an application is important to operators (e.g., site reliability engineering teams or developer teams of a website or a cloud-based application) to determine if users are being served quickly and without errors and, if not, which part of a business process is failing. SaaS and application service providers use RUM to monitor and manage service quality delivered to their clients and to detect errors or slowdowns on web sites.

BRIEF DESCRIPTION OF THE DRAWINGS

Illustrative examples are described in detail below with reference to the following figures.

DETAILED DESCRIPTION

Figure 1:
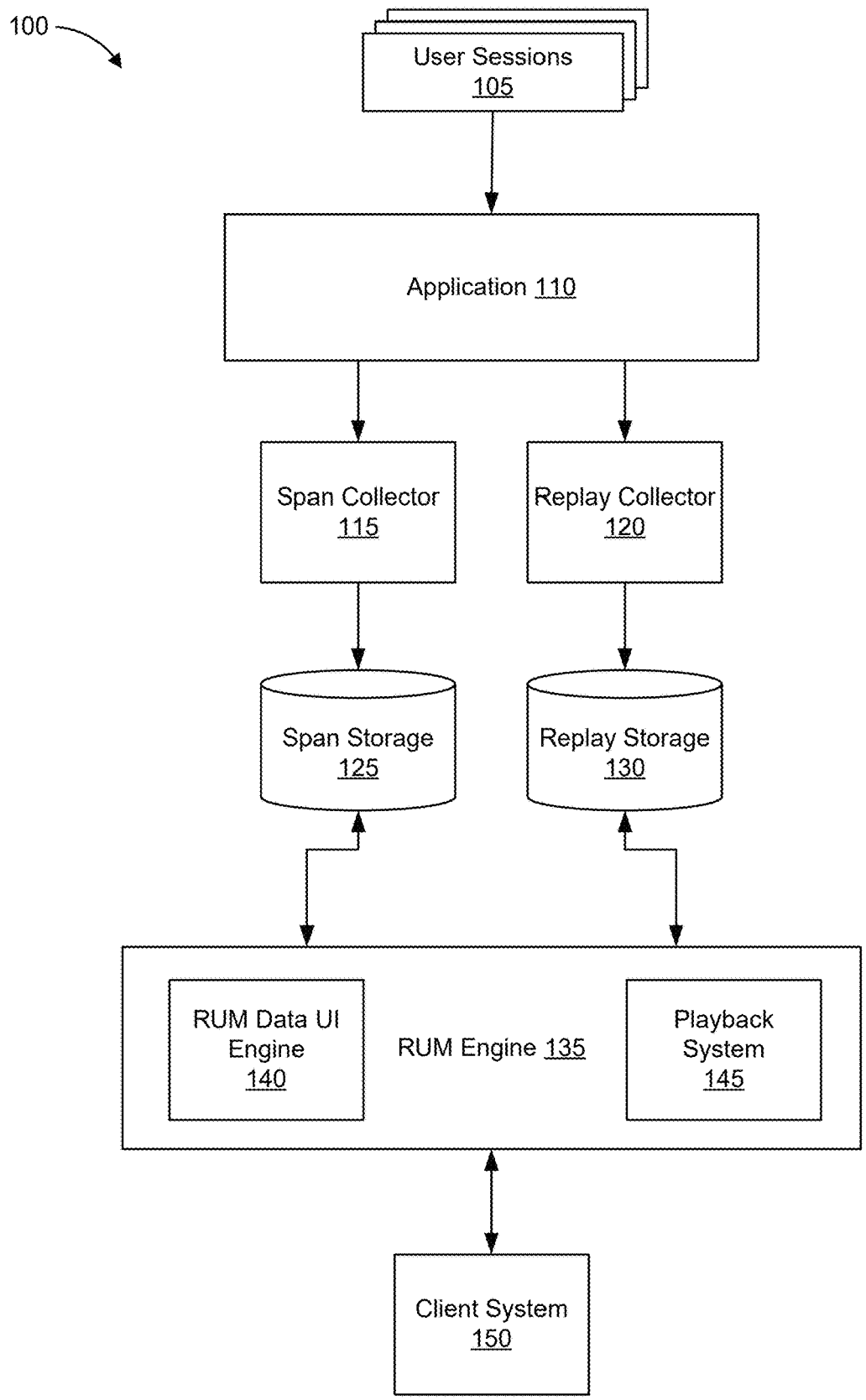
FIG. 1 provides a block diagram of an embodiment of an environment for collecting, storing, processing, and presenting session data for Real User Monitoring (RUM).

Techniques, which may be embodied herein as systems, computing devices, methods, algorithms, software, code, computer readable media, or the like, are described herein for concurrently visualizing session data with session playbacks. Real user monitoring (RUM) is the practice of using data from an application or website's real-life users to monitor and understand application performance. RUM tracks metrics, such as DNS timing, time-to-first-byte, full-page load time, scripting errors and the time it takes to load specific elements. These metrics are collected by monitoring actual user sessions. By monitoring real-user data across a variety of end-user configurations, browser versions, operating systems, feature flags, user status, locations, etc., software delivery and reliability teams can identify problems that negatively impact the user's digital experience and user satisfaction. RUM is a specific type of application monitoring that relies on the passive collection of data produced by real users in order to identify application availability or performance issues. RUM provides insights that are difficult to achieve through other performance monitoring techniques because it synthesizes and reports on data collected from actual human users. RUM may be used to monitor activity and provide visibility all the way from the browser through the network down to the backend services.

In RUM, an analysis of the spans generated during a session may be useful for identifying instances of reduced performance (e.g., errors, lag, etc.) by an application. However, debugging an application using spans alone may represent a significant time investment for engineers. In addition, it can often be difficult to determine the extent to which an error had an impact on the overall user experience, and therefore requires more immediate remediation.

By supplementing the analysis of spans generated during a session with session replay, application developers can gain a better understanding of whether an error or event had a significant impact on the user's experience or ability to complete their transaction as intended, and therefore require more immediate remediation. In particular, session replay may include the ability to replay, or recreate, an end user's journey on a browser or mobile application as a video playback.

Additional benefits associated with recreating the user's experience may include the ability to observe the exact conditions leading up to an error (e.g., the sequence of mouse clicks or keyboard strokes, particular content being displayed, etc.) in order to duplicate the error for debugging purposes. Further, by recreating the user's experience, developers can observe the same visual artifacts or symptoms of the error observed by a user. As another example, recreating the user experience may help application developers identify potential improvements to the look and feel of GUIs, the intended flow of the user experience, etc. that may result in conversion rate optimizations (e.g., by guiding customers efficiently through a shopping experience to checkout).

It will be appreciated that the above-described aspects may be implemented as methods, systems, computing devices, and/or non-transitory computer readable media. For example, a system or computing device may comprise one or more processors and a non-transitory computer-readable storage medium having stored thereon instructions that, when executed by the one or more processors, may cause the one or more processors to perform operations, such as operations corresponding to methods described herein. In another example, a non-transitory computer-readable storage medium may comprise or have stored thereon instructions that, when executed by the one or more processors, may cause the one or more processors to perform operations, such as operations corresponding to methods described herein.

1.0. Session Data Capture

FIG. 1 shows an overview of an example environment 100 for collecting, storing, processing, and presenting session data for Real User Monitoring (RUM). As illustrated, environment 100 includes an application 110. The application 110 may generate session data in real time from one or more user sessions 105 provided by the application 110. The application 110 may include application software executing on one or more servers designed to provide one or more services over a network. For example, the application 110 may be a website, a web application, a web service, or the like provided via a server or cloud-computing environment. The application 110 may be a cloud-native application installed within one or more commercial cloud-infrastructures accessible over the Internet. Additionally, or alternatively, the application 110 may be installed on a dedicated server system accessible via one or more private network connections, such as an intranet.

The application 110 may be developed and deployed as a single unit or as multiple units using a microservices architecture. For example, the application 110 may include a collection of modules, services, and/or microservices. Each constituent module, or service, of the application 110 may be a small, flexible, and autonomous unit of software that connects to other services to make up a complete application. Additionally, or alternatively, each service may represent a collection of Application Programming Interface (API) endpoints and operations that work together with other services' endpoints in a distributed and dynamic architecture to deliver the full functionality of the application 110. As used herein, a "service" may encompass container services, microservices, and calls to serverless functions. For example, the application 110 may include a front-end service designed to facilitate interactions by end-users with the application 110 and one or more back-end services designed to respond to the user interactions by storing and retrieving data from one or more data stores.

Each user session of the one or more user sessions 105 may represent an end user's experience or interaction with the application 110 over a period of time and is representative of the performance of the application 110 or the user experience of the application 110 across a broader group of end users. As used herein, a "user session", or simply a "session", may represent a group or collection of user interactions between an end-user and an application, such as the application 110. For example, a single session may represent a user's interactions with a web-based application, such as a website, web application, or web service, over a period of time. Interactions may represent actions a user conducts within a user interface, such as mouse clicks, taps on a touch screen, and keyboard events.

Additionally, or alternatively, sessions may represent one or more transactions, or traces, handled by the application 110 and its constituent services. Transactions, or traces, may represent a set of events triggered as a result of a single logical operation. For example, a transaction, or trace, may initiate when a user selects a button via a user interface to start an action on a website. Each session may be made up of multiple interactions, traces, or transactions from an initial request to a final response. For example, in the context of an e-commerce website, a session may start when the application 110 receives a request from a user's web browser for a page from the website, include multiple interactions (e.g., requests to add items to a shopping cart), and end after a user has completed a purchase and/or navigated away from the website (e.g., by closing the browser or navigating to a different website). Sessions may end upon termination or expiration. For example, sessions may be limited to a predefined time, such as 4 hours, at which point the first session expires and a new session is created or initiated. As another example, a first session may timeout after a predefined amount of time of inactivity, such as 15 minutes, at which point the first session expires and a new session may be initiated upon further interaction with the application 110. Additionally, or alternatively, a new session may begin in response to a user opening new tabs or triggering one or more redirects.

Each user session of the one or more user sessions 105 may be initiated from one or more types of client devices. Client devices may include smartphones, tablets, laptop computers, desktop computers, e-readers, and the like. Client devices may initiate a session using one or more types of user agents, or applications, executing locally on the client device. For example, one or more web browsers may be executed by a smartphone, tablet, laptop, or desktop computer to access a website, web application, or web service provided by the application 110. As another example, a user agent component of the application 110 may be developed for execution by a specific type of client device (e.g., a native application) and configured to, upon execution by the client device, initiate a session with a server component of the application 110.

The application 110 may include one or more User Interfaces (UIs), such as Graphical User Interfaces (GUIs), to facilitate interactions by a user with the application 110 during a session. For example, the application 110 may provide one or more GUIs in the form of a website including multiple webpages, or a web application, to a web browser or web view executing on a client device for rendering by the client device. Additionally, or alternatively, the application 110 may provide dynamic content based on one or more GUI templates defined for a client component of the application 110 to be rendered by a client device upon execution of the client component by the client device.

For each user session of the one or more user sessions 105, the application 110 may generate session data that may be collected and stored for subsequent analysis and evaluation of a respective user's experience with the application 110. Session data may include replay data, otherwise referred to herein as "recreation data", recorded by the application 110 while providing the one or more UIs that facilitate interactions by a user with the application 110 during a session. The application 110 may further generate, or otherwise collect, spans in response to user interactions or requests during a user session.

As described further herein, "spans" may represent individual and/or composite units of work, or operations, performed by the application 110 in response to user action. Additionally, or alternatively, a "span" may represent a call to a microservice or a function within a microservice of the application 110 in response to a user interaction with the application 110. Collectively, the spans produced in response to a user interaction may be referred to as, or associated with, a trace as described above.

Each span may include information or data related to, or describing, the unit of work represented by the respective span. For example, each span may include contextual data such as a trace ID representing the trace of which the span is a part, an ID for the span, a name for the span, a parent span ID representing the parent span from which the current span was generated, start and end timestamps for the span, and the like. Each span may further include attributes including metadata or information about the operation represented by the span (e.g., a user ID, a shopping cart ID, an ID for an item to be added to a shopping cart, etc.). As another example, spans may include events, such as a structured log message or annotation, used to denote a meaningful singular point in time during a span's duration (e.g., denoting when a page becomes interactive). In yet a further example, each span may include a status indicator representing the status of the operations or unit of work represented by the span, such as an error status set in response to an exception being handled in the software. Additional or alternative pieces of information or fields may be defined in a software library, application programming interface, or other observability framework that defines a span object or data structure, such as the OpenTelemetry framework.

As further illustrated, environment 100 includes a span collector 115 and span storage 125. The span collector 115 may include one or more services or software components separate from the application 110 executing within the same computing environment as the application 110 or in a separate computing environment connected via one or more network connections to the application 110. The span collector 115 may be configured to receive spans, and their associated information as described above, generated by the application 110, process the spans, and export the spans for storage in the span storage 125.

The span collector 115 may receive spans generated by the application 110 via a push or a pull functionality implemented by the application 110. For example, the application 110 may be implemented to push spans to the span collector 115 as they are generated and/or after a predefined number of spans have been captured by the application 110. As another example, the application 110 may be implemented to provide spans generated by the application 110 in response to requests from the span collector 115.

The span collector 115 may further be configured to process spans collected from the application 110 prior to export and/or storage. For example, the span collector 115 may modify one or more attributes or pieces of information comprising a span, place spans, metrics, and logs into batches, filter spans based on one or more metrics, apply one or more tags to the spans, and the like. After processing the spans, the span collector 115 may export the spans for storage in the span storage 125. Spans may be exported as a file, such as a JSON file, via a console or terminal, and the like. The span collector 115 may be implemented using one or more versions or distributions of OpenTelemetry or other similar observability frameworks.

As further illustrated, environment 100 includes a replay collector 120 and replay storage 130. The replay collector 120 may include one or more services or software components executing within the same computing environment as the application 110 and/or in a separate computing environment connected via one or more network connections to the application 110. The replay collector 120 may be configured to record replay data generated by the application 110 in response to providing a UI to a user and/or updating the UI during the course of a session. For example, upon initially providing a UI to a user, the replay collector 120 may record the initial data used by the application 110 to provide the UI. Subsequently, the replay collector 120 may record replay data as additional user interactions are performed in the application UI. The replay collector 120 may proceed to convert the replay data into a compressed string, such as a gzipped JSON string, for export to the replay storage 130.

In some examples, the replay collector 120 is configured to redact one or more types of information while recording the replay data. For example, the replay collector 120 may be configured to redact, or omit, text, images, personally identifiable information, sensitive fields (e.g., passwords, credit card information, etc.), objects, and the like, while recording the replay data. In this way, sensitive or protected information provided to or by a user may not be collected, duplicated, or distributed outside of the application in a manner that is unprotected.

As described further herein, the span storage 125 and the replay storage 130 may store replay data and fields common to both spans and replay data respectively. For example, spans and replay data may be stored in association with a "Session ID" field identifying the particular user session from which the spans and replay data were generated by the application 110. As another example, the spans and replay data may be stored in association with a "timestamp" field identifying the time at which the span or replay data was generated by the application 110. In yet another example, the spans and replay data may be stored in association with an "application" field distinguishing the application 110 from other applications. Additionally, or alternatively, spans and replay data may be stored in associated with a "page redirection ID" field associating a page redirection or opening of a new tab by a user.

As further illustrated, environment 100 includes a RUM engine 135 and client system 150. The RUM engine 135 may include one or more applications or software services configured to process, analyze, and present session data in such a way that users of the client system 150 may identify and investigate errors affecting the end user experience provided by the application, as described further herein. The RUM engine 135 may receive session data from the span storage 125 and/or the replay storage 130 in response to requests from a user of the client system 150 to analyze the quality of service provided to users by the application. In response to requests from a user of the client system 150, the RUM engine 135 may query for data relevant to the user's request from the span storage 125 and/or replay storage 130. For example, in response to a request for more information about a user session, the RUM engine 135 may query for spans and replay data stored in the span storage 125 and the replay storage 130 associated with the user session. Such a request, and the associated query, may include a unique SessionID associated with the user session.

As further illustrated, the RUM engine 135 includes a RUM data UI engine 140 and a playback system 145. As described further herein, the RUM data UI engine 140 may include one or more modules or services designed to analyze and present RUM data, such as spans and the information they comprise, generated by the application 110 from a user session of the one or more user sessions 105. Likewise, the playback system 145 may include one or more modules or services designed to analyze and present replay data generated by the application 110 from a user session of the one or more user sessions 105. Combined, the RUM data UI engine 140 and the playback system 145 may provide functionality to the client system 150 to visualize, and interact with, session data.

2.0. Session Data Processing

Figure 2:
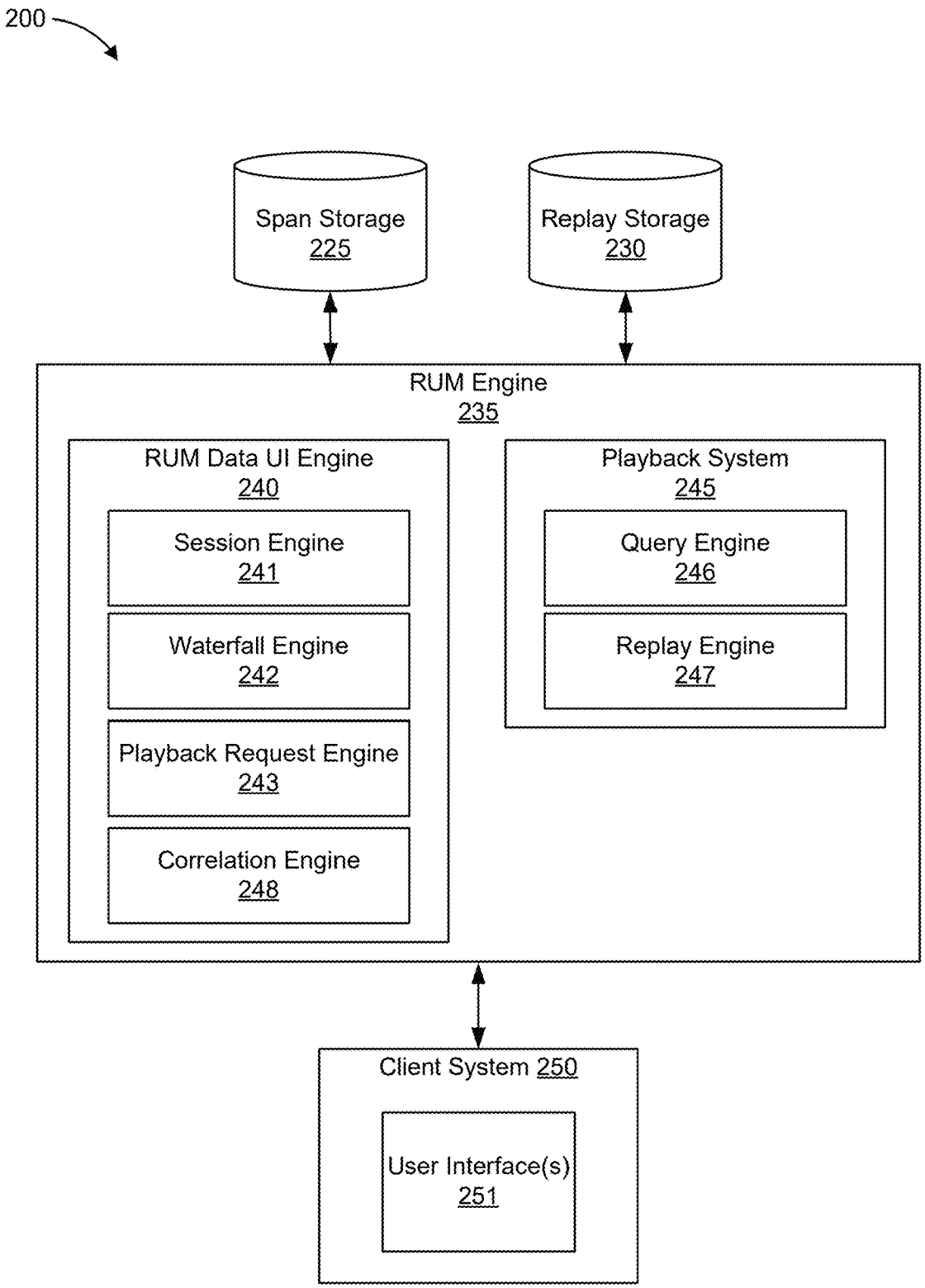
FIG. 2 provides a block diagram of an example RUM engine as part of an environment for collecting, storing, processing, and presenting session data for RUM.

FIG. 2 shows an overview of an example environment 200 for processing and presenting session data for RUM. Specifically, FIG. 2 shows a RUM engine 235 providing an interface between span storage 225, replay storage 230, and a client system 250. The RUM engine 235 may be the same as or different from the RUM engine 135 described above. For example, as illustrated, the RUM engine 235 includes a RUM data UI engine 240 and a playback system 245. The span storage 225 may be the same as or different from the span storage 125 described above. The replay storage 230 may be the same as or different from the replay storage 130 described above.

The RUM data UI engine 240 may be the same as or different from the RUM data UI engine 140 described above. For example, the RUM data UI engine 240 may include one or more modules or services designed to analyze and present RUM data, such as spans and the information they comprise, generated by an application, such as the application 110 described above, from a user session. As further illustrated, the RUM data UI engine 240 includes a session engine 241, a waterfall engine 242, a playback request engine 243, and a correlation engine 248.

The session engine 241 may include one or more software components configured to receive, process, and present RUM data associated with a particular user session. The session engine 241 may receive the RUM data, including correlated span details/fields, associated with a particular session from one or more data stores, such as the span storage 225. The session engine 241 may further process the RUM data to identify and/or determine one or more characteristics about a particular session. For example, the session engine 225 may identify the session by a Session ID, determine the start time, duration, and end time of the session, identify information about the user agent used to access the application (e.g., browser software and version), the geographic location from which the application was accessed, the number and type of events that occurred during the session (e.g., document load events, script error events, network error events, data transfer request events, resource events, user action/interaction events, and custom events), and the like.

The session engine 241 may further present the RUM data in a GUI rendered by a user interface 251 of the client system 250. In some cases, the session engine 241 presents RUM data in response to a request to view additional information about a particular session associated with an error produced by an application during the user session. For example, while evaluating the end user experience provided by an application, a user may identify one or more errors, or events of interest, produced by the application. In some cases, the errors may be identified by analyzing a data store comprising observability data associated with an application. After identifying a particular error of interest, a user may request additional information related to the number and type of user sessions during which the error occurred. From a list of user sessions in which the error occurred, a user may further request additional information related to a particular user session. In response, the session engine 241 may present the RUM data associated with the particular user session to the user.

The waterfall engine 242 may include one or more software components configured to receive, process, and present the spans associated with a particular user session. The waterfall engine 242 may receive the spans associated with a session from the session engine 241, from another service executing on the RUM engine 235, or directly from the span storage 225. For example, after receiving a request to view spans associated with a particular type of event, or that occurred during a particular timeframe, the session engine 241 may provide the relevant spans to the waterfall engine 242 for presentation on the user interface 251 of the client system 250. Additionally, or alternatively, the session engine 241 may provide the waterfall engine 242 with the information necessary to access the relevant spans from a separate service or directly from the span storage 225.

After receiving the spans, the waterfall engine 242 may provide a visualization of the spans to the client system 250 for display on the user interface 251. For example, the waterfall engine 242 may provide a waterfall visualization of the spans that groups hierarchies of spans, as described further herein, with high level information from each span. The waterfall engine 242 may further provide one or more interactive capabilities to the user interface 251 of the client system 250. For example, in response to receiving a selection of a particular span in the visualization, the waterfall engine 242 may display additional information from the selected span. As another example, the waterfall engine 242 may transmit an indication of the selected span to one or more other modules of the RUM engine 235 for additional processing, such as the playback system 245 as described further herein.

The playback request engine 243 may include one or more software components configured to initiate a playback, or recreation, of the replay data associated with a particular session. The playback request engine 243 may act as the interface between the RUM data UI engine 240 and the playback system 245. For example, the playback request engine may initiate and control the presentation of replay data associated with a particular user session by the playback system. Additionally, or alternatively, the playback request engine 243 may receive requests from the playback system 245 to present, or otherwise modify the presentation of, RUM data by the RUM data UI engine 240.

The playback system 245 may be the same as or different from the playback system 145 described above. For example, the playback system 245 may include one or more modules or services designed to analyze and present replay data generated by an application, such as the application 110 described above, from a user session. As further illustrated, the playback system 245 includes a query engine 246, and a replay engine 247. As described above, the playback system 245 may be initiated, or otherwise caused to present replay data associated with a particular user session, by the playback request engine 243 of the RUM data UI engine 240. For example, the playback request engine 243 may transmit a request to the playback system 245 including the information necessary for the playback system to access and present the relevant replay data associated with the particular session.

The query engine 246 may include one or more software components configured to receive the replay data for a particular user session. The query engine 246 may receive replay data from the replay storage 230 by querying for replay data associated with a particular user session. For example, after receiving a request from the playback request engine 243 including a session ID for a particular user session, the query engine 246 may retrieve replay data stored in association with the session ID from the replay storage 230. After receiving replay data associated with a particular user session, the query engine 246 may provide the replay data to the replay engine 247.

The replay engine 247 may include one or more software components configured to present replay data for a particular user session. Presenting replay data for a particular user session may include causing the user interface 251 of the client system 250 to render a recreation of the GUIs provided by an application during the particular user session from the perspective of the original user interacting with the application, including any changes to the GUI in chronological order. Accordingly, while referred to as presenting "replay data" associated with a user session, it should be understood that presenting such data does not necessarily include replaying or presenting a recording of the user session in the sense commonly applied to replaying digital data representing a stream of images as a video. Instead, and as explained further herein, presenting replay data associated with a user session may include recreating the GUIs presented during a user session using the data used to render the GUIs during the user session in the first place. For example, as described further herein, applications may utilize object models representing GUI objects and their associated attributes to render a GUI during a user session. Subsequently, changes or mutations in the object model may be used to render updates to the GUI during the user session. Using the original object model, and the sequence of mutations to the object model that occurred during the user session, a recreation of the GUI can be rendered along with the updates to the GUI that occurred during the user session in chronological order.

The replay engine 247 may further present one or more playback controls (e.g., play/pause, skip, fast forward, reverse, etc.) configured to enable a user of the client system 250 to control playback of the recreated user session. The replay engine 247 may present the recreation in real-time, or near-real-time. Additionally, or alternatively, the replay engine 247 may playback the recreation of the user session by skipping from one visually observable event to the next at a predefined rate. For example, the replay engine 247 may begin by recreating a GUI in a first state as provided to a user at the start of the user's session. After a predefined amount of time, the replay engine 247 may render the GUI in a second state based on the first event recorded during the user's session that resulted in a visual change to the GUI, and so on. In some cases, the predefined amount of time may be selected in order to enable a user of the client system 250 to observe and process each change that occurred during a user session. For example, the predefined amount of time may be 1 second, 3 second, 5 seconds, or more. Skipping from one visually observable event to the next may enable a user of the client system 250 to observe the relevant interactions between a user and an application that occurred during a user session in a shorter amount of time than the actual length of time represented by the user session.

The replay engine 247 may further identify one or more events, or times, in the replay data that may be of interest to a user of the client system 250. The events or times may correspond to user interactions with an application that occurred during a user session (e.g., mouse clicks, scrolls, keyboard presses, selections, etc.). As described further herein, the replay engine 247 may provide one or more indicators for each event along a timeline representing the length of the user session. In some examples, the replay engine 247 includes one or more software components or libraries used to both record the replay data during a session as well as recreate the session from the recorded replay data, as described above in relation to the replay collector 125.

The correlation engine 248 may include one or more software components designed to correlate spans with replay data by identifying fields common to each, such as session ID, timestamp, page redirection ID, script ID, and the like. For example, the correlation engine 248 may correlate timestamps associated with spans to timestamps associated with the replay data. As described above, spans may be associated with timestamps corresponding to the time at which the spans were generated by an application. Similarly, replay data may be associated with timestamps corresponding to the time at which a GUI event occurred (e.g., a change in the appearance or underlying structure of the GUI). Additionally, or alternatively, the correlation of span and replay page redirection, or opening a new tab in a web browser, may be captured by a page redirect ID identified in both sets of data.

Using the timestamps associated with spans, the correlation engine 248 may identify particular events in the replay data corresponding in time to spans of interest. For example, based on a first timestamp associated with a particular span, the correlation engine 248 may identify two consecutive events in the replay data corresponding to a first event that was recorded prior to the first timestamp and a second event that was recorded after the first timestamp. After identifying one or more events in the replay data that occurred close in time to the timestamp associated with a span, the correlation engine 248 may cause the replay engine 247 to begin presenting the replay data starting at the identified one or more events.

The correlation engine 248 may receive timestamps associated with spans for correlation with the replay data from the playback request engine 243 and/or the waterfall engine 242. For example, in response to a selection of a particular span from the visualization of the spans, the waterfall engine 242 may transmit a request to the correlation engine 248, directly or through the playback request engine 243, to begin presenting the replay data starting close in time to when the span was generated by the application. In response, the correlation engine 248 may identify the event in the replay data that occurred just prior to, or just after, the particular span and cause the replay engine 247 to present the replay data on the user interface 251 of the client system 250 starting at the event.

Additionally, or alternatively, the correlation engine 248 may use timestamps associated with events recorded in the replay data to control presentation of the RUM data by the RUM data UI engine 240. For example, as the replay engine 247 presents the replay data in chronological order, the correlation engine 248 may cause the waterfall engine 242 to present spans generated close in time to the most recent event presented by the replay engine 247.

3.0. Replay Data

As described above, applications may provide one or more GUIs to facilitate interaction between a user and the application during a user session. For example, an application may provide one or more GUIs in the form of a website including multiple webpages, or a web application, to a user agent, such as a web browser, executing on a client device for rendering by the client device. In some cases, the GUIs are provided by an application to a user agent in the form of a document, such as an HTML document representing a web page. As part of rendering GUIs using a document, user agents may generate an object-oriented representation of the document, such as a Document Object Model (DOM), or other logical model, that represents the objects comprising the structure and content of the document to facilitate subsequent manipulation of the document, and thereby the visual appearance of the GUIs rendered from the document.

Figure 3A:
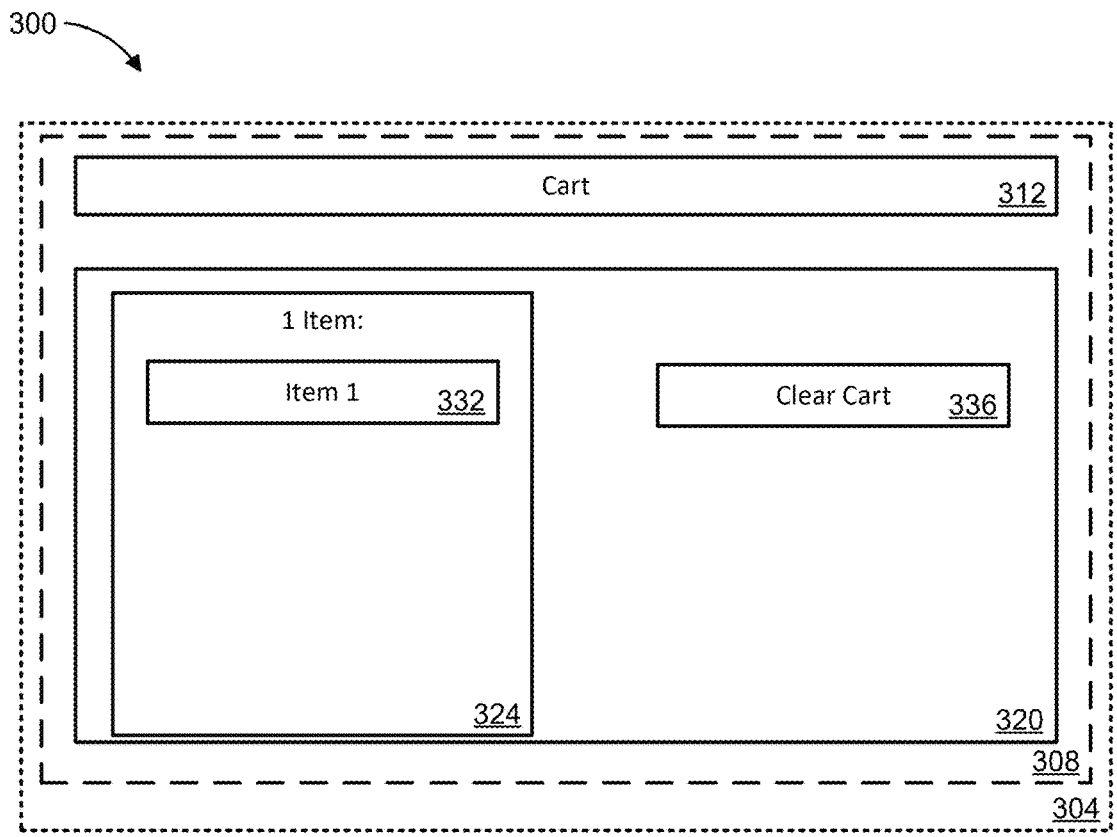
FIG. 3A provides a representation of a Graphical User Interface (GUI) rendered from a document provided by an application.
Figure 3B:
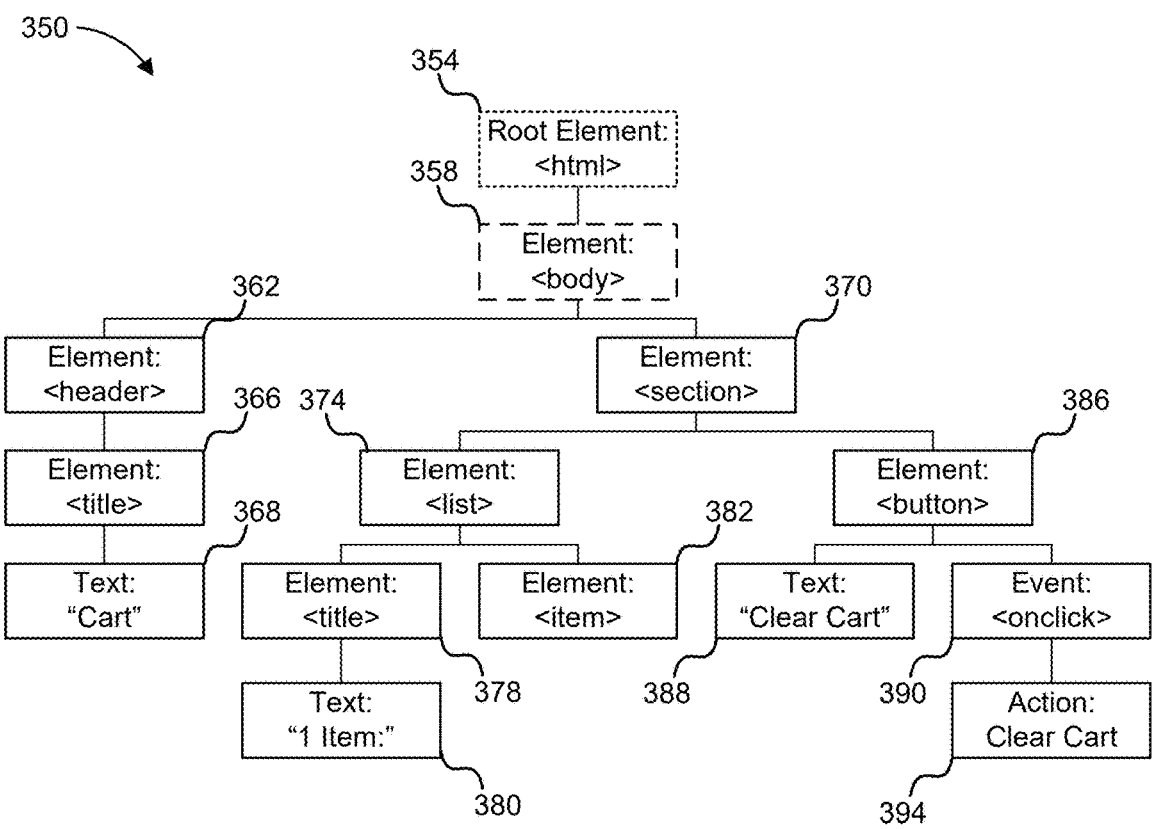
FIG. 3B provides a representation of a simplified object model corresponding to the GUI of FIG. 3A.

FIG. 3A and FIG. 3B provide an example of the relationship between a GUI and its corresponding DOM. In particular, FIG. 3A provides a representation 300 of a simple GUI rendered from an initial document provided by an e-commerce application, such as a front-end service executing on a webserver. For comparison, FIG. 3B provides a simplified object model 350 corresponding to the representation 300 generated from the initial document provided by the application. As illustrated in the representation 300, the dashed lines represent logical or structural elements defined in the document, but that are not visible upon rendering the document as a webpage, including a root element 304 and a body element 308.

As further illustrated in the representation 300, the solid lines represent visible elements defined in the document. For example, within the body element 308, the document may define a header element 312 and a section element 320. The header element may further define a title element 312 including the text "cart" for display within the header element 312. The section element 320 may define a list element 324 including a title displaying the text "1 Item:" and one or more list items including item element 332 displaying the text "Item 1". The section element 320 may further define a button element 336 displaying the text "Clear Cart". In response to an interaction with the button element 336, the items in the list element 324 may be removed from the webpage. Additionally, or alternatively, one or more backend services comprising the application and executing on the webserver may be called to respond to the user interaction with the button element 336. Accordingly, a user interaction with the button element 336 may both result in a modification, or mutation, to the visual appearance of the GUI, as well as a collection of operations, or spans, performed by one or more microservices comprising the application.

After, or concurrently with, receiving the document from the application, the simplified object model 350 may be generated by parsing the document elements into nodes starting with the root element 304 as the root node 354. As new elements are defined in the document, new nodes may be added to the object model as child nodes to a parent node corresponding to the element within which the new element is defined in the document. For example, because the body element 308 is defined within the root element 304, a new body node 358 is added as a child node to the root node 354. Each node may be a parent to one or more child nodes, and each node after the root node may have one or more sibling nodes. For example, the body node 358 includes two child nodes that are siblings, a header node 362 and a section node 370, corresponding to the header element 312 and the section element 320.

To further illustrate, the header node 362 includes a title node 366 corresponding to the title of the header element 312, which includes a text node 368 corresponding to the text displayed in the title of the header element 312. Further, the section node 370 includes two child nodes, a list node 374 and a button node 386, corresponding to the list element 324 and the button element 336 respectively. The list node 374 may further include two child nodes, a title node 378 and an item node 382, corresponding to the title of the list element 324 and the item element 382 respectively. The title node 378 may further include a text node 380 corresponding to the text displayed in the title of the list element 324. The button node 386 includes two child nodes, a text node 388 and an event node 390, corresponding to the text displayed in the button element 336 and the event generated in response to an interaction with the button element 336. Finally, the event node 390 may include an action node 394 corresponding to the action performed in response to the event generated in response to the interaction with the button element 336.

As demonstrated above, while a GUI may be rendered from a document provided by an application, the DOM generated by parsing the document may also be used to create, or recreate, the GUI. Accordingly, in some examples, replay data from a user session may initially include a copy, or snapshot, of the DOM in its original state as generated from the initial document provided by the application at the beginning of the user session. In some cases, this may be referred to as an initial DOM tree state. As used herein, the state of an object model may refer to the entire object model, including each node and their respective hierarchies. Further, as described herein, the copy, or snapshot, of the initial DOM tree state may be serialized and transmitted for storage by a replay collector, such as the replay collector 125 described above.

As described above, some content included in the DOM may be omitted or redacted in the copy of the DOM. For example, text, images, personally identifiable information, fields, objects, and the like, may not be included or may be redacted in some way (e.g., replaced with a special character) in the copy of the DOM. In this way, sensitive or protected information provided to or by a user may not be collected, duplicated, or distributed outside of the application in a manner that is unprotected.

In addition to enabling subsequent recreation of the GUI, a DOM, or other similar object-oriented representation of the document, may act as an API so that other software components provided by the application along with the initial document, such as scripts executed by the user agent, may dynamically manipulate the document's structure, style, and content in order to affect corresponding changes to the visual appearance of the GUI rendered from the document. In this way, the underlying document that represents the GUI may be modified without requesting a new document from a webserver.

For example, in response to a user interaction with the button element 336, the event node 390 may generate, produce, or "fire", an "onclick" event. In response, an event listener, or handler, method defined in a script corresponding to the action node 394 may be called. Subsequently, the method may modify the object model 350 starting at the list node 374 by removing the item node 382 and modifying the text node 380. While described herein as generating events in response to user interactions, other types of events (e.g., DOM events), may be generated by nodes in the DOM without interaction from a user.

Figure 4A:
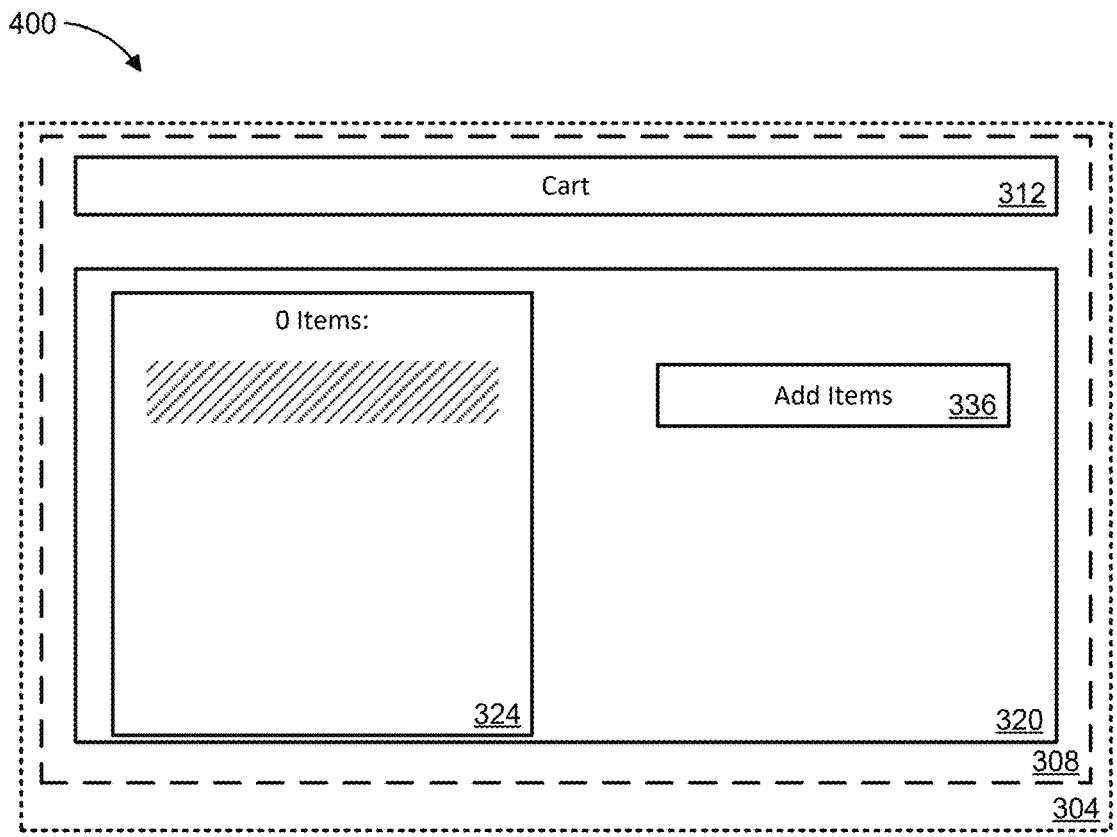
FIG. 4A provides a modified representation of the GUI of FIG. 3A in response to a modification to the object model.
Figure 4B:
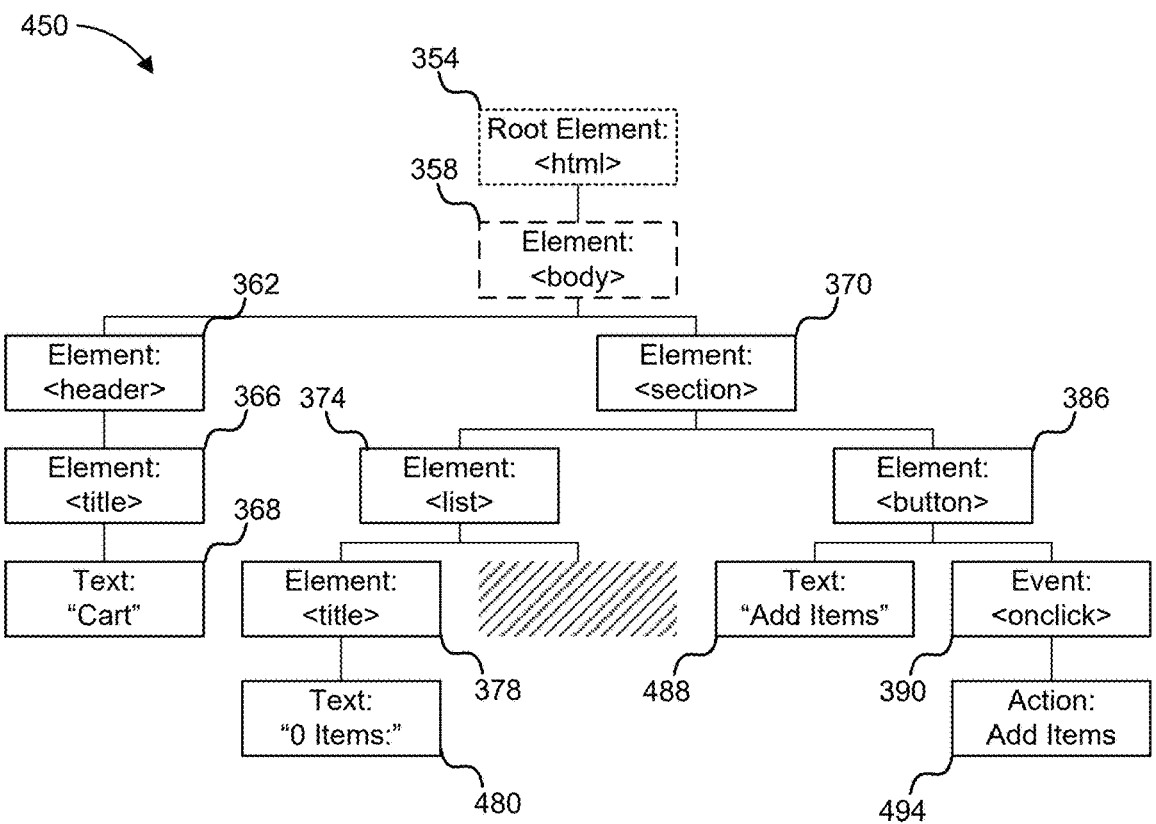
FIG. 4B provides a modified representation of the simplified object model corresponding to the GUI of FIG. 4A.

FIG. 4A and FIG. 4B provide an example of the corresponding changes, or mutations, to the GUI of FIG. 3A and the DOM of FIG. 3B as a result of such an event. In particular, FIG. 4A provides a modified representation 400 of the simple GUI based on the modifications to the object model 350 performed in response to the user interaction with the button element 336 of FIG. 3A. As illustrated in the representation 400, the title of the list element 324 has been updated to display the text "0 Items:" and the list element 324 no longer includes any item elements compared with the representation 300 of FIG. 3A, (e.g., as illustrated by a rectangular box with diagonal shading representing the location of the original item element 332). Further, the text of the button element has been modified to display "Add Items" compared with the original text of "Clear Cart" displayed in representation 300.

FIG. 4B provides the modified object model 450 representing the changes to the object model 350 that resulted in the modified representation 400. For example, compared with the object model 350, the original text node 380 has been replaced with a new text node 480 including the text "0 Items:", and the list node 374 no longer includes an item node 382 (e.g., as illustrated by a rectangular box with diagonal shading). Further, the original text node 388 has been replaced with a new text node 488 including the text "Add Items", and the original action node 394 has been replaced with a new action node 494 corresponding to a new action that will be performed in response to the event generated by the event node 390 of the button node 386. While described herein as nodes original nodes being replaced with new nodes, it should be understood that similar modifications may be affected by instead modifying the content of a particular node. Similarly, while described as either replacing, modifying, or removing nodes, it should be understood that other actions performed on an object model may also include adding new nodes, rearranging nodes within the object model, and the like.

As demonstrated above, modifications, or mutations, to the original state of an object model may result in a modified state of the object model. Accordingly, and as explained above, each new state of an object model may be used to create, or recreate, the GUI. However, as demonstrated above, mutations from one DOM state to the next DOM state may not, and in many cases do not, involve changes to the entire DOM. Accordingly, recording and/or transmitting each new DOM state in its entirety may be inefficient as a result of the excess processing power used to serialize each new state and/or transmit each state over a network to a web server. Instead, some examples avoid such inefficiencies by recording each mutation between subsequent states as replay data, which may subsequently be used to recreate each subsequent state.

4.0. Rum Data

As described above, a user session may represent a group or collection of user interactions between an end-user and an application. In response to a user interaction with the application, one or more microservices comprising the application may be called to respond to the interaction. For example, in response to a user interaction requesting completion of a shopping transaction, an initial call to a front-end service may initiate separate calls to a checkout service, a payment service, an email notification service, a shipping service, a currency service, and the like, directly from the front-end service and/or from one service to the next, in order to complete the user's transaction.

As used herein, a "span" may represent a call to a service, and/or a logical unit of work performed by a corresponding service. As further described above, each span may include information or data related to, or describing, the unit of work represented by the respective span. Collectively, the spans produced in response to a user interaction may be represented as a trace. Over the course of a user session involving multiple user interactions, the traces, their associated spans, and the information included in each span, may be collected, processed, and stored for analysis. By analyzing the traces and spans (e.g., RUM data) generated during one or more user sessions, application developers may be able to monitor the performance of an application. In particular, because spans relate to an end user's experience, analyzing such data may help developers identify certain engagements, activities, or interactions, that may result in reduced performance of the application (e.g., errors, lag, etc.) and determine the extent to which the reduced performance has an impact on the overall user experience.

Figure 5A:
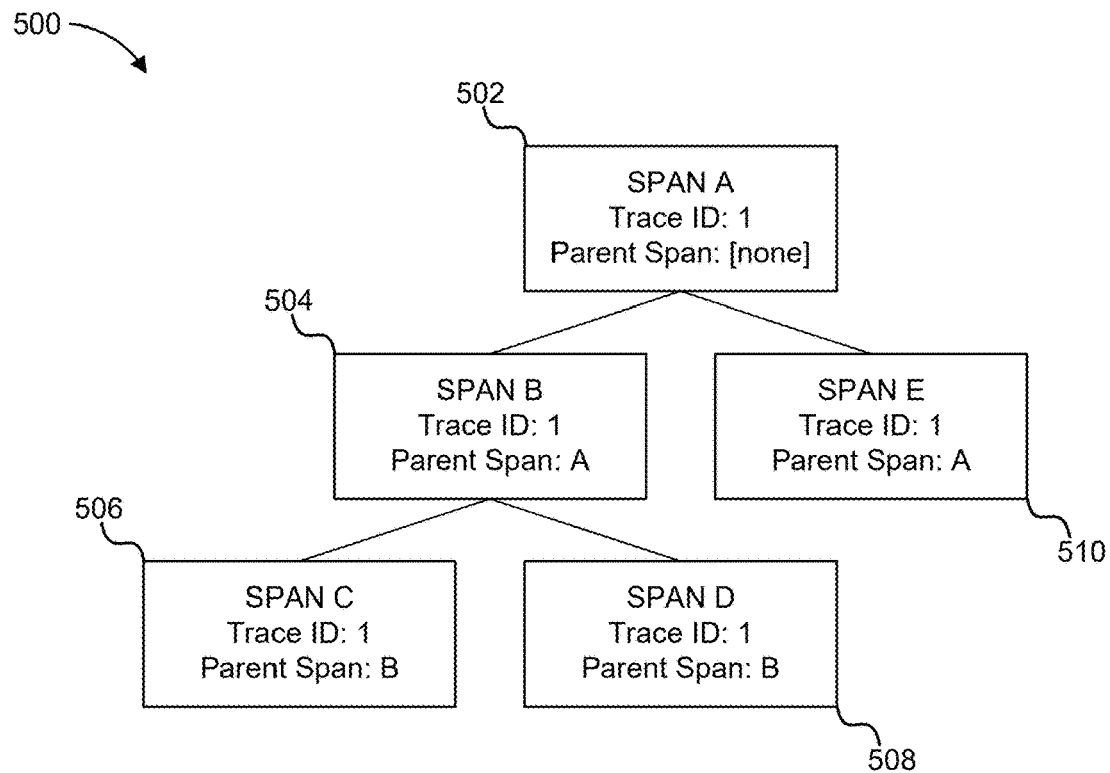
FIG. 5A provides a visual representation of trace tree including multiple spans.

FIG. 5A provides a trace tree 500 representing an example trace. The first span in the trace tree 500, Span A 502, may be referred to as the root span. A trace tree typically comprises a root span, which is a span that does not have a parent. It may be followed by one or more child spans. Child spans may also be nested as deep as the call stack. Span B 504 and Span E 510 are child spans of the parent span, Span A 502. Further, Span C 506 and Span D 508 are child spans of Span B 504. While illustrated and described in relation to high level information associated with each span, it should be understood that each span may further include additional information or data related to, or describing, the unit of work represented by each span, including metrics, actual data values, operation status, and the like.

Figure 5B:
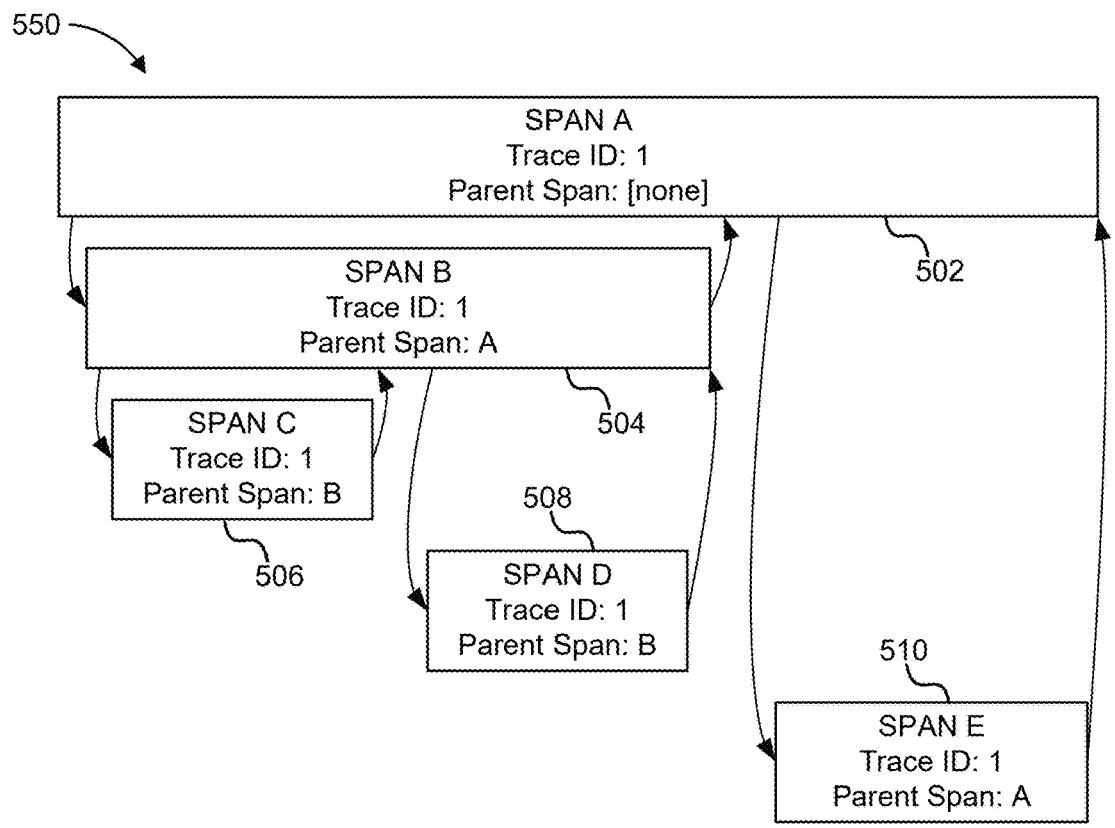
FIG. 5B provides an alternative view of a trace tree adjusted for display along a timeline.

FIG. 5B provides a timeline view 550 of the example trace from FIG. 5A. The trace starts with the Span A 502, where a transaction, user interaction, or request starts. The the trace starts, a Trace ID is generated (e.g., Trace ID: 1 as shown in FIG. 5A and FIG. 5B), which follows the request as it propagates through the distributed system. A new span is generated for each logical chunk of work in the request, where the new span includes the same Trace ID, a new Span ID, and a Parent Span ID, which points to the Span ID of the new span's logical parent. The parent Span ID creates a parent-child relationship between spans.

A given request typically comprises one span (e.g., the root Span A 502) for the overall request and a child span for each outbound call made to another service, database or function within the same microservice, etc. as part of that request. For example, in the example of FIG. 5B, the Span A 502 is the root span for the overall request and generates several child spans to service the request. The span A 502 makes a call to the Span B 504, which in turn makes a call to the Span C 506, which is a child span of the Span B 504. The Span B 504 also makes a call to the Span D 508, which is also a child span of the Span B 504. The Span A 502 subsequently calls the Span E 510, which is a child span of the Span A 502. As demonstrated, the spans in a given trace may comprise the same Trace ID. The Trace ID, along with the Parent Span IDs, may be used to consolidate the spans together into a trace and/or under a parent span.

5.0. Span Visualization

As described above, some examples include one or more applications or software services configured to process, analyze, and present session data in such a way that application developers may identify and investigate errors affecting the end user experience provided by an application. As further described above, one component of identifying and investigating such errors includes analyzing spans associated with user sessions to identify engagements, activities, or interactions, that may result in an application exhibiting reduced performance (e.g., errors, lag, etc.). Due in part to the potentially great length of a single user session, and the correspondingly large number of spans generated by each component of an application during a user session, systems and methods of presenting spans and their associated session data that process, organize, filter, and ultimately visualize the spans in an efficient manner may enable application developers to quickly identify errors and their root cause.

Figure 6:
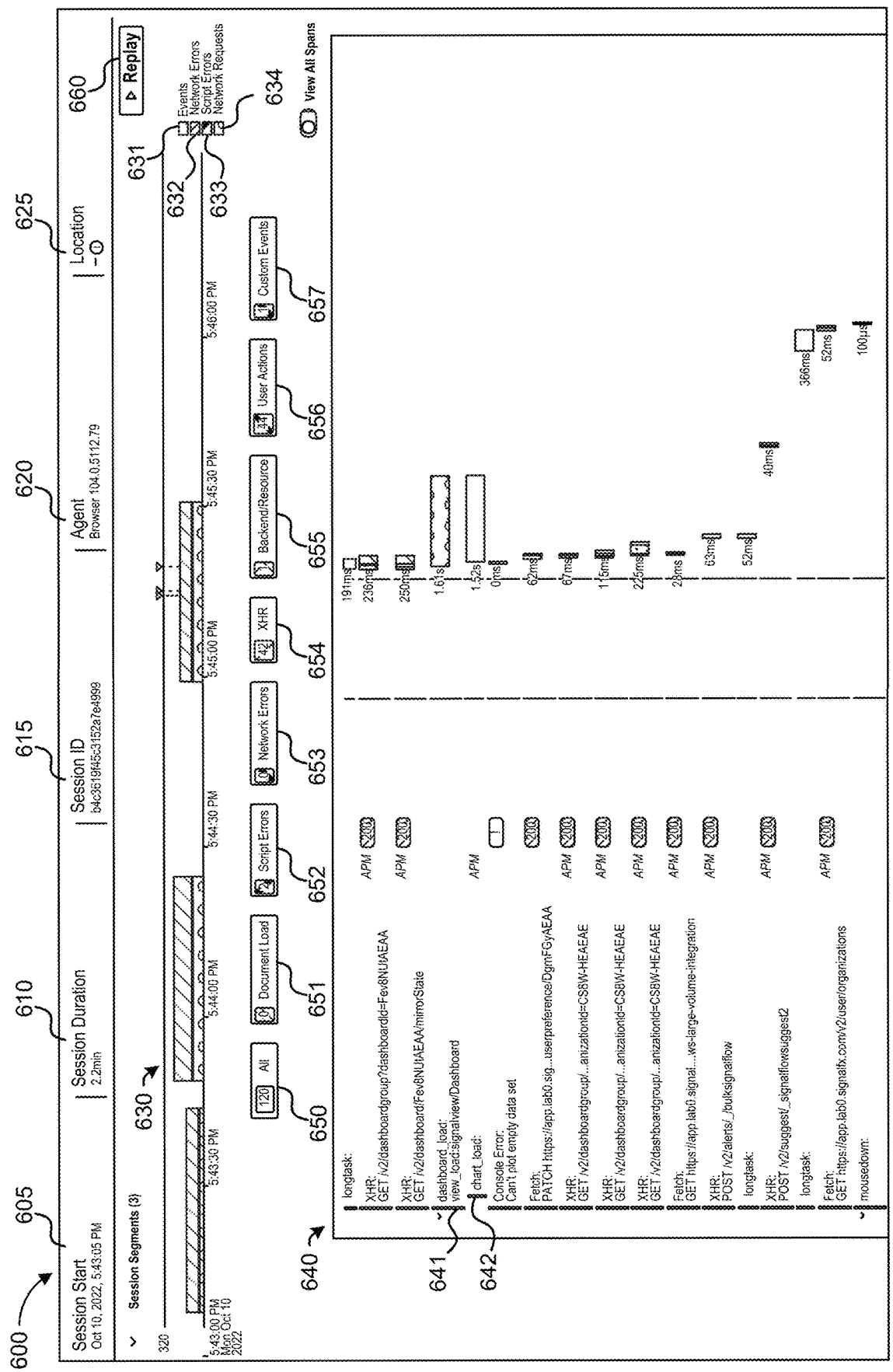
FIG. 6 provides an example GUI designed to display information associated with user sessions including a visualization of spans.

FIG. 6 provides an example GUI 600 designed to display information associated with user sessions including a visualization of spans generated during a particular user session. The GUI 600 may include fields conveying high-level metrics and information about a user session including a start time 605, a session duration 610, a session ID 615, a user agent 620 used to access the application, a location 625 from which the application was accessed, and the like. As further illustrated, the GUI 600 may include a session replay option 660. In response to a selection of the session replay option 660, the GUI 600 may initiate a playback of the GUIs presented to the user, as well as any user interactions that occurred during the session, as described further herein.

The GUI 600 may further include a graphic visualization 630 of a user session at an aggregate level along a time axis. For example, the graphic visualization 630 may display aggregated events and metrics computed for the user session as a bar chart where the horizontal axis represents the duration of the user session and the vertical axis represents the number of events or metrics generated at a particular time, or within a particular window of time, during the user session. In some examples, the events or metrics are separated into separate categories. For example, the GUI 600 may aggregate events 631 (e.g., page load events), errors 632, script errors 633, and requests 634 associated with a user session. The errors 632 and the script errors 633 may be aggregated separately to provide additional insight into where errors occurred, e.g., to distinguish between frontend script errors (e.g., from a script executed by a user agent) and an error that may have surfaced from the backend (e.g., from a microservice executing on a webserver).

As further illustrated, the GUI 600 may include a waterfall visualization 640 of spans generated during a user session. As illustrated, the waterfall visualization 640 presents each span as a row of information associated with the span. The waterfall visualization 640 may order the spans in ascending or descending order based on the time at which each span was generated by an application. Each row in the waterfall visualization 640 may include one or more pieces of information associated with the corresponding span as well as one or more visual indicators representing categories or types of information associated with spans. For example, each row may include text and/or a visual indicator, such as a highlight color, indicating a type of span. As further illustrated, each row may include text describing the particular action, operation, or call, represented by a span. Such information may initially be displayed in the waterfall visualization 640 from high level information obtained from each span.

The spans displayed in the waterfall visualization 640 may be root-level or parent spans, such as parent span 641, that can be expanded out to reveal other child spans, such as child span 642. For example, in response to receiving a selection of a parent span, such as parent span 641, one or more rows of child spans, such as child span 642, may be expanded for display underneath the row for the parent span 641. Upon a subsequent interaction with a parent span, the child spans may be collapsed from the display. Additionally, or alternatively, in response to an interaction with a particular span, additional information from the selected span may be displayed in a pop-up window partially covering the waterfall visualization 640. Such additional information may include the attributes, events, status indicators, and the like included in each span.

The spans displayed in the waterfall visualization 640 may be filtered based on one or more filter criteria. For example, GUI 600 may include icons associated with various types of spans or events, including all events 650, document load events 651, script error events 652, network error events 653, server request events 654, backend/resource events 655, user action events 656, and custom events 657. In response to a selection of a particular icon, the spans displayed in the waterfall visualization 640 may be filtered to remove spans not associated with the selected icon. Additionally, or alternatively, the spans currently displayed in the waterfall visualization 640 may be scoped to a particular region or portion of the user session.

6.0. Replay Visualization

As described above, while an analysis of the spans generated during a session may be useful for identifying interactions or events that may result in an application exhibiting reduced performance (e.g., errors, lag, etc.), it can often be difficult to determine the extent to which the reduced performance had an impact on the overall user experience, and therefore require more immediate remediation, from an analysis of spans alone. For example, while an error may have occurred during a user session and may be subsequently identified in the spans generated during the user session, the particular type of error may not be observable to users and/or may not directly affect the user's ability to continue interacting with the application (e.g., to complete their transaction with the application). Accordingly, such errors may be determined not to have a significant impact to users. By comparison, significant errors and events that directly affect a user's ability to complete their transaction, or interact with the application as desired, may be determined to have a significant impact on the user's experience.

In some examples, distinguishing between the two cases described above may be relatively straightforward based on the spans generated after the error or event occurred. For example, if the quantity of spans generated after an error or event occurred indicate that a user continued to interact with the application, or if the final spans are consistent with spans indicating a successful completion of a transaction with the application, it may be determined that the error or event did not affect the user's ability to continue interacting with the application. Alternatively, if there are no spans generated after an error or event occurred, it may be determined that the error or event was the reason the user stopped interacting with the application.

However, in some cases, users may continue interacting with an application, and therefore spans may continue to be generated, after a significant error or event occurs that impacts the user's ability to complete their transaction or interact with the application as desired. In these cases, it may be difficult to determine whether the error or event was significantly impactful based on spans alone because the user continued to interact with the application.

Accordingly, by replaying, or recreating, the user's experience during the session, application developers can gain a better understanding of whether an error or event had a significant impact on the user's experience or ability to complete their transaction as intended, and therefore require more immediate remediation. For example, in the case of an e-commerce website, by recreating the user's experience during the session, a developer can see that, while the user continued to interact with the website after an error occurred preventing the user from completing their purchase, the user was not ultimately able to complete the purchase before leaving the website.

Additional benefits associated with recreating the user's experience may include the ability to observe the exact conditions leading up to an error (e.g., the sequence of mouse clicks or keyboard strokes, particular content being displayed, etc.) in order to duplicate the error for debugging purposes. Further, by recreating the user's experience, developers can observe the same visual artifacts or symptoms of the error observed by a user. As another example, recreating the user experience may help application developers identify potential improvements to the look and feel of GUIs, the intended flow of the user experience, and the like that may result in conversion rate optimizations (e.g., by guiding customers efficiently through a shopping experience to checkout).

As described above, replaying, or recreating, the user's experience during a session may include recreating the GUIs as they were originally displayed to the user during the session as opposed to playing a video of a screen recording captured during the session. For example, using copies of an object-oriented representation of the document used to initially render the GUI (e.g., a DOM), and subsequent modifications to the object-oriented representation, a recreation of the GUI, and any modifications thereto, may be presented to an application developer for playback.

Figure 7:
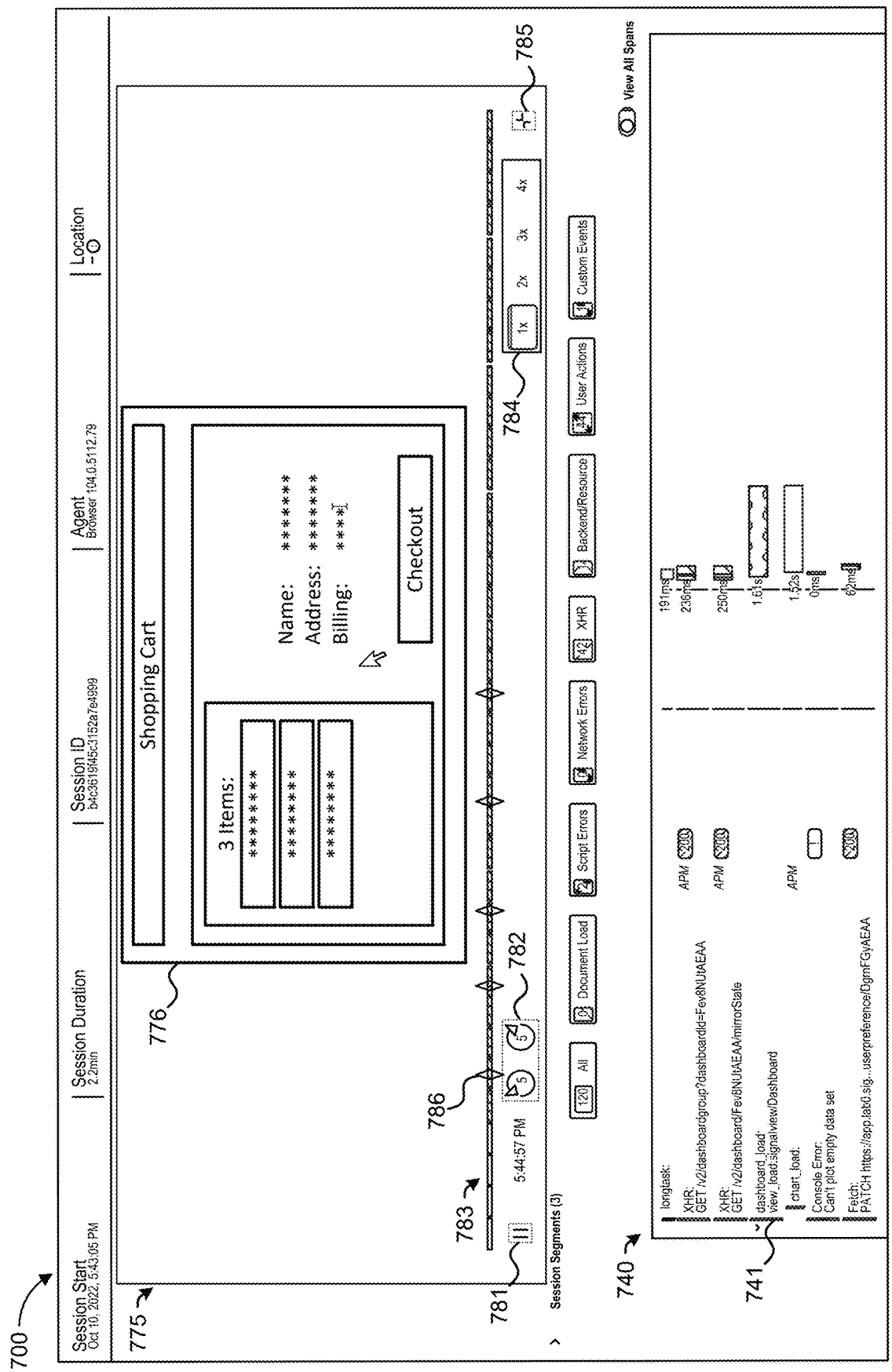
FIG. 7 provides an example GUI including a visualization of spans generated during a particular user session and a playback of the user's session.

FIG. 7 provides an example GUI 700 including a visualization of spans generated during a particular user session and a playback of the user's experience during the particular user session. The GUI 700 may be the same, or a slightly modified version, of the GUI 600 described above. For example, the GUI 700 may include fields for high level information about a user session, a graphical visualization of the user session at an aggregate level, and a waterfall visualization 740 of spans generated during the user session. As further illustrated, the GUI 700 includes a session replay viewer 775, within which a recreation 776 of a user's experience during a user session may be rendered along with one or more options to control and monitor the playback of the recreation 776, including play/pause control 781, skip controls 782, timeline scrubber 783, playback speed controls 784, and viewer size controls 785.

In some examples, the GUI 700 is presented in response to a request for playback of a user session. Additionally, or alternatively, the GUI 700 may be presented by updating a previous GUI to include the session replay viewer 775. For example, by updating the GUI 600 to include the session replay viewer 775 in response to receiving a selection of the session replay option 660 described above, the GUI 700 may be displayed. Prior to, or in conjunction with, presenting the GUI 700 and/or the session replay viewer 775, and in further response to a request for a playback of a user session, replay data recorded from the user session may be identified and/or retrieved from a data store. For example, the replay data may be queried from a data store using the session ID associated with the particular user session displayed in the GUI 700.

After receiving replay data recorded from a user session (e.g., an initial DOM state and one or more DOM mutations), the session replay viewer 775 may render the recreation 776 of the initial application GUI presented to the user at the start of the user session (e.g., from the initial DOM state). Additionally, or alternatively, the session replay viewer 775 may render the recreation 776 starting at a particular point in time during the user session. The particular point in time may be selected from a playback control option, such as skip controls 782 or timeline scrubber 783, or based on the time at which a particular event or span was generated during the user session. A particular span may be automatically selected based on one or more predefined criteria, such as the first span just prior to the first error of a particular type, or in response to a user interaction selecting a particular span, such as the parent span 741, from the waterfall visualization 740.

Using the timestamp and redirection ID associated with a selected span, a corresponding point in the replay data may be identified as the particular point at which the session replay viewer 775 will render the recreation 776. For example, based on the timestamp from a span, a DOM mutation with the same timestamp, or a DOM mutation that occurred immediately prior to the timestamp, may be identified. The session replay viewer 775 may then synchronously execute the preceding mutations to the initial DOM state to render the recreation 776 of the DOM state as it was just prior to the timestamp associated with the selected span (e.g., after the identified DOM mutation has been executed). Additionally, or alternatively, based on the redirection ID associated with a span, replay data with a matching redirection ID may be identified for recreation at the particular time associated with the span. Additional use of the redirection ID may enable accurate recreation of a user session in which a user opened multiple tabs on a browser at the same time.

Playback of the recreation 776 may begin automatically in response to displaying the session replay viewer 775 or in response to one or more interactions. For example, in response to a selection of the play/pause control 781, the playback may begin from the beginning, the last point in time at which the playback was paused, or a previously selected point in time. Additionally, or alternatively, in response to a selection of a particular point in time (e.g., from the skip controls 782, the timeline scrubber 783, or the waterfall visualization 740), playback may resume or begin at the particular point in time.

Upon initiating playback, the session replay viewer 775 may render the recreation 776 in near real time or in intervals. For example, in near real-time, the session replay viewer 775 may render mutations at the dynamic rate in which they occurred during the user session, resulting in a playback length that is approximately the same as the session duration. Alternatively, rendering each mutation in intervals (e.g., one mutation per second, per 5 seconds, per 10 seconds, etc.) may reduce the overall playback length and allow a viewer to achieve the effect of fast forwarding through periods of inactivity that occurred during the user session.

During playback, the session replay viewer 775 may indicate when one or more types of events associated with rendering the recreation 776 occur. For example, as the session replay viewer 775 modifies the recreation 776 based on a mutation, the session replay viewer 775 may emit an event including information about the mutation. As another example, the session replay viewer 775 may emit user interaction events (e.g., mouse or keyboard interactions) as such interactions are replayed. In some examples, the events emitted by the session replay viewer 775 may be used to control other aspects of the GUI 700. For example, in response to a user interaction being replayed, the waterfall visualization 740 may identify a corresponding span for display within the waterfall visualization.

As illustrated, the session replay viewer 775 may identify one or more types of events that occurred during the user session from the replay data for indication within the timeline scrubber 783. For example, the session replay viewer 775 may identify user interaction events that occurred during the user session at particular times and include indicators 786 at corresponding points along the timeline scrubber 783. Additionally, or alternatively, the session replay viewer 775 may include indicators 786 corresponding to particular events or spans generated during the user session. For example, based on the timestamps associated with errors identified in the waterfall visualization 740, the session replay viewer 775 may include indicators 786 at corresponding points along the timeline scrubber 783. In some examples, the type of events indicated in the timeline scrubber 786 may be selected or updated in response to one or more selections made via the GUI 700. For example, in response to a selection of the network error events 753 icon, the timeline scrubber 783 may update the number and location of the indicators 786 to represent the number and times of network errors that occurred during the user session.

As further described above, information (e.g., text, images, and personally identifiable information) visible to a user or entered by a user during a user session may be redacted from the replay data as it is recorded. Additionally, or alternatively, certain elements, or classes of elements, in the replay data may be blocked from recreation. For example, while the application GUI presented to the user during the user session may have included text (e.g., as in FIG. 3A), the recreation 776 displays a string of asterisks indicating that text was present in one or more fields during the user session but has been redacted for the recreation 776 to protect the original user's privacy.

6.0. Examples of Session Replay

Figure 8:
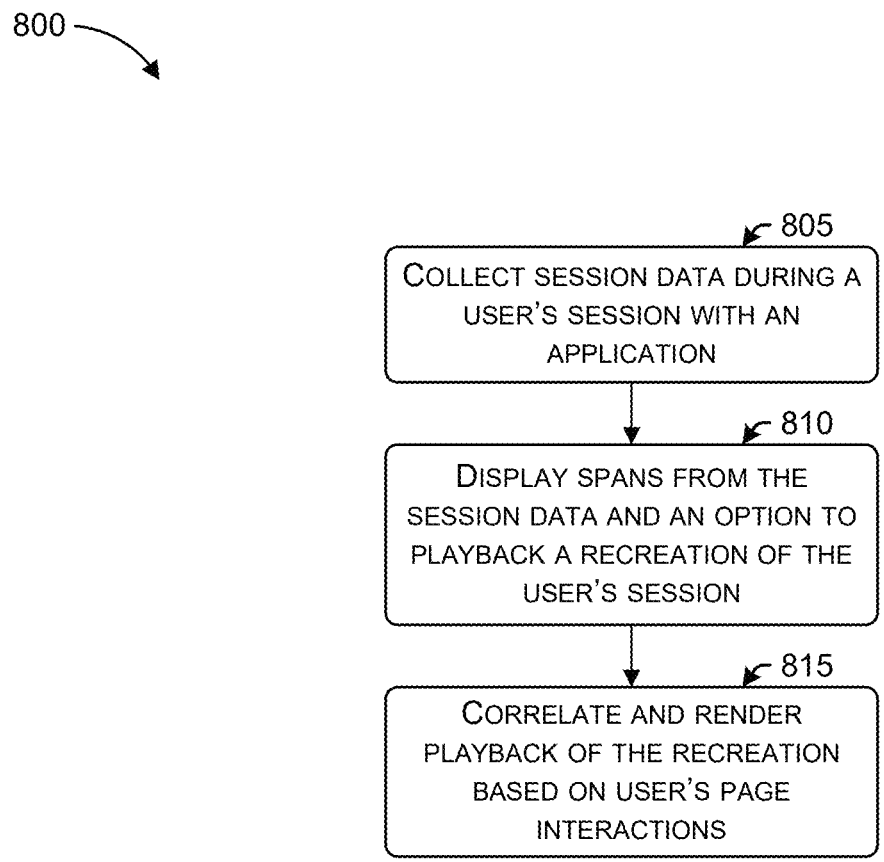
FIG. 8 provides an overview of an example method for playing a recreation of a user session.

FIG. 8 provides an overview of an example method 800 for playing a recreation of a user session. At block 805, session data is collected during a user's session with an application. As described above, the application may be a website, a web application, a web service, or the like and the session may represent the user's experience or interactions with the application over a period of time. The session data may include RUM data, such as traces and spans, generated by one or more services comprising the application in response to user interactions or requests. The session data may further include replay data representing the GUIs, and any modifications made thereto or user interactions therewith, provided by the application during the user's session. The session data may be collected by one or more services or software components, such as the span collector 115 and the replay collector 120 described above, and stored in one or more data stores, such as the span storage 125 and the replay storage 130 further described above.

At block 810, spans from the session data are displayed along with an option to playback a recreation of the user's session. As described above in relation to FIG. 6, the spans may be displayed in a waterfall visualization that groups hierarchies of the ingested spans together. The spans may be displayed in a GUI on a client device by one or more software services separate from the application, such as the RUM engine 135 and/or the RUM data UI engine 140 described above. The option to playback a recreation of the user's session may submit a request to one or more services, such as the playback system 245 described above, to render a recreation of the GUIs, and any modifications made thereto or user interactions therewith, during the user's session. In response to the request, the recreation may be rendered in the same GUI used to display the spans or in a separate GUI on the client device.

At block 815, a playback of the recreation is correlated and rendered based on user's page interactions. As described above, the playback of the recreation may be initiated in response to a request, such as a selection of the option to playback the recreation displayed at block 810. Subsequently, one or more user interactions may be used to control the playback of the recreation, as further described in relation to FIG. 7. For example, a selection of a span displayed at block 810 may render the playback of the recreation to begin at a time corresponding to the time and page redirection ID at which the selected span was generated during the user's session, as described in relation to FIG. 10.

Figure 9:
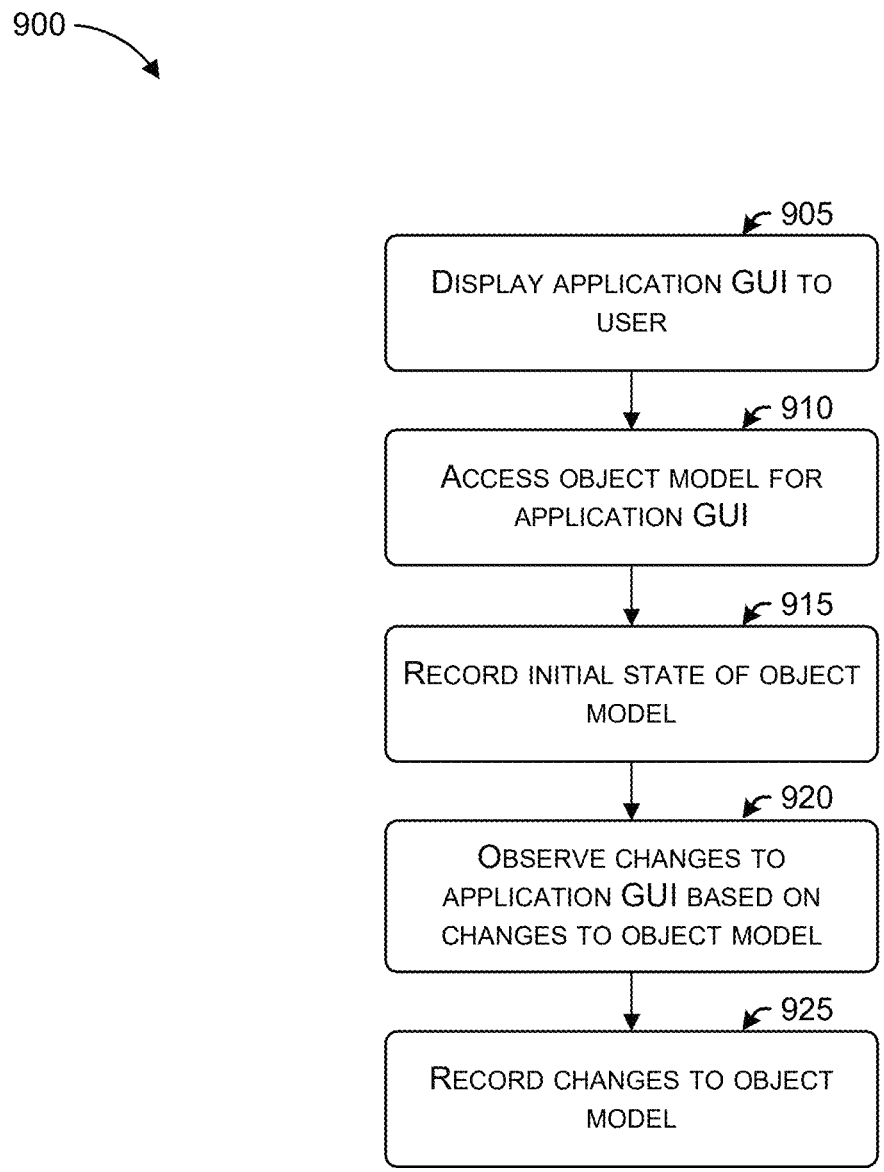
FIG. 9 provides an overview of an example method for storing replay data from a user session.

FIG. 9 provides an overview of an example method 900 for storing replay data from a user session. At block 905, an application GUI is displayed to a user. As described above, the application may be a website, a web application, a web service, or the like. Displaying the application GUI to the user may include providing a document, such as an HTML document, including various executables, such as scripts, to a user agent executing on the device used by the user to access or otherwise initiate interactions with the application. Upon receiving the document and other executables, the user agent executing on the user's device may render the application GUI for display to the user using the document and other executables.

At block 910, an object model for the application GUI is accessed. As further described above, the object model may be an object-oriented representation of the structure and content of the document used by the user agent to display the application GUI, such as a DOM. After the object model has been generated by the user agent using the document, other components of the application, such as scripts, endpoints, and/or APIs executed by the user agent, may modify an updated copy of the object model.

At block 915, an initial state of the object model is recorded. For example, after accessing the object model, software executed by the user agent, such as a script associated with the application, may create a copy of the object model in its initial state as a string, such as a JSON string. Recording the initial state of the object model may further include transmitting the compressed copy of the object model to a remote server associated with the application for storage in a datastore, such as the replay storage 130 described above, in association with the session ID for the user's session.

At block 920, changes to the application GUI are observed based on changes to the object model. As described above, changes to the application GUI may be made by modifying the underlying object model. Accordingly, one or more observers may be registered with the object model to receive notifications from the object model when the structure or content of the model are modified. Subsequently, as the object model is modified to change the application GUI, the object model may provide the registered observers with an indication of each modification.

At block 925, the changes to the object model are recorded. After receiving the indication of each modification made to the object model, a copy of each modification as a string, such as a JSON string, may be created. Recording the changes to the object model may further include transmitting the compressed copy of each modification to a remote server associated with the application for storage in a datastore, such as the replay storage 130 described above, in association with the session ID for the user's session and a timestamp representing the time at which the modification was made.

Figure 10:
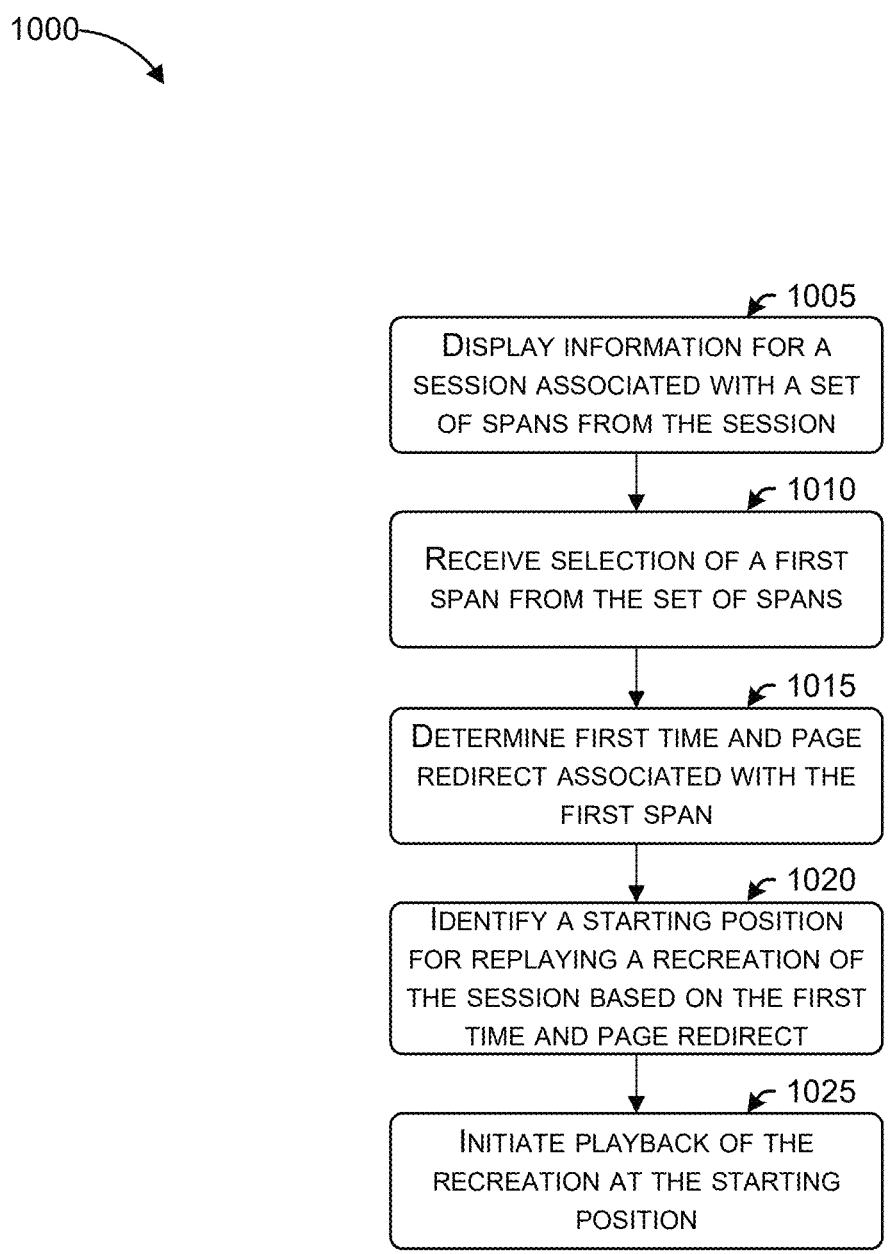
FIG. 10 provides an overview of an example method for controlling playback of a user session recreation.

FIG. 10 provides an overview of an example method 1000 for controlling playback of a user session recreation. At block 1005, information is displayed for a session associated with a set of spans from the session. As described above, the session may represent an end user's experience or interactions with an application, such as a website, web application, or web service, over a period of time. In response to user interactions or requests, the services comprising the application may generate one or more sets of spans. Subsequently, information about the session associated with the one or more sets of spans may be displayed in a GUI on a client device for analysis and evaluation. For example, as described above in relation to FIG. 6, the information may include the session start time, stop time, duration, unique session ID associated with the session, unique page redirection ID, information about a user agent used by the user for the session, and the like. The information may also include a visualization of the spans generated during the session and one or more results of analyzing the spans, such as the number of events and/or errors that occurred during the session.

At block 1010, a selection of a first span from the set of spans is received. The selection of the first span may be received from the GUI displaying the information about the session. For example, a user may select the first span from a waterfall visualization that groups hierarchies of spans together. At block 1015, a first time and a unique page redirection ID associated with the first span is determined. For example, the first time may be determined from a timestamp associated with the first span indicating the time at which the span was generated by the application. Additionally, or alternatively, the first time may be determined from a timestamp associated with a parent span that resulted in the first span's generation. Similarly, the unique page redirection ID of the session may be determined from a page redirection ID included in the span.

At block 1020, a starting position for replaying a recreation of the session is identified based on the first time associated with the first span. As described above, replaying a recreation of the session may include recreating the GUIs, and any modifications made thereto or user interactions therewith, provided by the application to the user during the session using replay data recorded during the session. As further described above, replay data recorded during a session may include an initial state of an object model representing a GUI, and any modifications made thereto, during the session. Using the first time determined at block 1015, a corresponding point in the replay data may be identified. For example, using timestamps associated with each modification made to the object model, the modification that occurred just prior to the first time may be identified as the starting position for replaying the recreation of the session.

At block 1025, playback of the recreation is initiated at the starting position. Initiating playback of the recreation at the starting position may include synchronously executing each modification to the object model beginning at the initial state of the object model and ending at the modification that occurred just prior to the first time identified as the starting position to reproduce the state of the object model as it was during the session just prior to the first time. The state of the object model as it was just prior to the first time may then be used to render the recreation of the session for display on the client device at the starting position. Subsequent modifications to the object model after the starting point may then be asynchronously executed to render the remainder of the recreation.

7.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112 (f) (AIA), other aspects may likewise be embodied as a means-plus-function claim, or in other forms, such as being embodied in a computer-readable medium. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

What is claimed is:

1. A computer-implemented method, comprising:
   receiving spans and recreation data generated in response to users using respective client devices to interact with an application installed on a server system, wherein:
   the recreation data is generated on the respective client devices;

each span represents an operation performed by the application on the server system in response to a user interaction with the application;

the spans are generated on the server system by the application from data generated on the server system by the application; and hierarchies of the spans each represent a collection of operations performed by the application in response to a corresponding user interaction, and relationships between child spans and parent spans in each hierarchy represent relationships between corresponding child operations in the collection of operations that are initiated by corresponding parent operations in the collection of operations;

rendering, in a first graphical user interface (GUI), a visualization of first spans of the spans that were generated in response to a user interacting with the application using a client device during a session, wherein the visualization displays hierarchies of the first spans together;

identifying, in response to receiving a request from the first GUI for a playback of the session, first recreation data generated on the client device in response to events generated by the application during the session; and rendering a recreation of the application during the session in the first GUI using the first recreation data.

2. The computer-implemented method of claim 1, wherein the first spans are associated with a first set of timestamps, the first recreation data is associated with a second set of timestamps that overlap with the first set of timestamps, and the method further comprises:

receiving a selection of a first span associated with a first timestamp from the first set of timestamps; and advancing, using the second set of timestamps, the rendering of the recreation of the application to be after a second timestamp from the second set of timestamps that occurred before the first timestamp.

3. The computer-implemented method of claim 1, wherein the first recreation data is associated with a first set of timestamps, the first spans are associated with a second set of timestamps that overlap with the first set of timestamps, and the method further comprises:

updating the rendering of the recreation of the application to be at a first timestamp from the first set of timestamps; and rendering, using the second set of timestamps, a subset of the first spans that were generated before the first timestamp in the visualization of the first spans.

4. The computer-implemented method of claim 3, wherein the first recreation data is associated with a page redirection ID and the subset of the first spans were generated with the page redirection ID.

5. The computer-implemented method of claim 1, wherein the visualization is a waterfall visualization, and the method further comprises:

filtering the first spans rendered in the waterfall visualization according to a first span type selected from the group consisting of a document load span type, a frontend error span type, a network error span type, a data transfer span type, a resource span type, a user interaction span type, and a custom event span type.

6. The computer-implemented method of claim 1, wherein the session is associated with a session identifier and the first recreation data is identified using the session identifier.

7. The computer-implemented method of claim 1, wherein a user interface of the application was rendered in a second GUI during the session using an object model, the first recreation data includes changes to the object model that occurred during the session, and rendering a recreation of the application comprises rendering the user interface in the first GUI using the object model with an option to render the changes to the object model in chronological order.

8. The computer-implemented method of claim 7, wherein the first recreation data includes changes to the object model made in response to interactions with the application via the user interface during the session.

9. The computer-implemented method of claim 7, further comprising recording the object model and the changes to the object model as the first recreation data using a service that listens for the events generated by the application during the session.

10. The computer-implemented method of claim 9, further comprising configuring the service to redact or omit one or more types of data in the object model and the changes to the object model while recording recreation data.

11. The computer-implemented method of claim 10, wherein the one or more types of data include text, images, and personally identifiable information (PII).

12. The computer-implemented method of claim 1, further comprising rendering a timeline of the session in the first GUI, wherein the timeline comprises one or more event indicators at points along the timeline that correspond to times during the session when a subset of events occurred.

13. The computer-implemented method of claim 12, wherein the subset of events are identified from the first recreation data and represent user interactions.

14. The computer-implemented method of claim 12, wherein the subset of events are identified from the first spans and represent user interactions or wherein the subset of events are identified from the first spans and represent errors detected while performing an operation by the application in response to the user interacting with the application.

15. The computer-implemented method of claim 12, wherein the timeline of the session is rendered as an interactive scrubber in the first GUI, and the method further comprising:

receiving a selection of a first event type;

identifying, in response to receiving the selection, the subset of events that correspond to the first event type; and populating the interactive scrubber with the one or more event indicators that correspond to the subset of events identified in response to receiving the selection.

16. The computer-implemented method of claim 12, further comprising rendering, in response to receiving a selection of an event indicator, the recreation of the application at the time during the session corresponding to the event indicator.

17. The computer-implemented method of claim 1, wherein the spans and the recreation data are received from different data stores.

18. The computer-implemented method of claim 1, wherein the application is a website, a web application, or a web service installed on the server system and accessed by the user with a user agent executing on the client device;

each child span includes an identifier of the parent span from which the child span was generated; and the recreation data is generated by the user agent executing on the client device.

19. A computing device, comprising:
a processor; and
a non-transitory computer-readable medium having stored thereon instructions that, when executed by the processor, cause the processor to perform operations corresponding to the computer-implemented method of claim 1.

20. A non-transitory computer-readable medium comprising instructions that, when executed by one or more processors, cause the one or more processors to perform operations cause the processor to perform operations corresponding to the computer-implemented method of claim 1.

* * * * *